INVENTOR.
SHOJI TSUCHIYA

United States Patent Office 3,218,549
Patented Nov. 16, 1965

3,218,549
IMPEDANCE PLOTTER FOR COAXIAL SMITH CHART
Shoji Tsuchiya, Suginami-ku, Tokyo, Japan, assignor to Nippon Telegraph & Telephone Public Corporation, Tokyo, Japan, a corporation of Japan
Filed Nov. 9, 1962, Ser. No. 236,656
4 Claims. (Cl. 324—58)

The invention relates to impedance plotter and particularly to impedance plotter for coaxial Smith chart.

In consequence of the rapid development of circuit elements in VHF and UHF bands, such as transistors and Esaki-diodes etc. in recent years, it is desired, with interest, to introduce practical measuring instruments with which circuit constant of coaxial circuits, that is to say, complex reflection coefficients and complex transfer coefficients can be plotted directly. There have been introduced hitherto a number of devices after various principles to meet this requirement.

However, these methods do not provide satisfactory practical performances as to their width of bands, accuracy and simplicity.

The invention was made in consideration of above defects of conventional devices and it aims among others to afford:
(1) Simple layout of circuits,
(2) Possibility for application to wider band area, for example for measuring the range varying from 25 mc. to 2500 mc.,
(3) Possibility of application to measurement of reflection coefficients and transfer coefficients.

The principle of the invention will be described in the following referring to the drawings and some embodiments of the invention:

Figure 1:
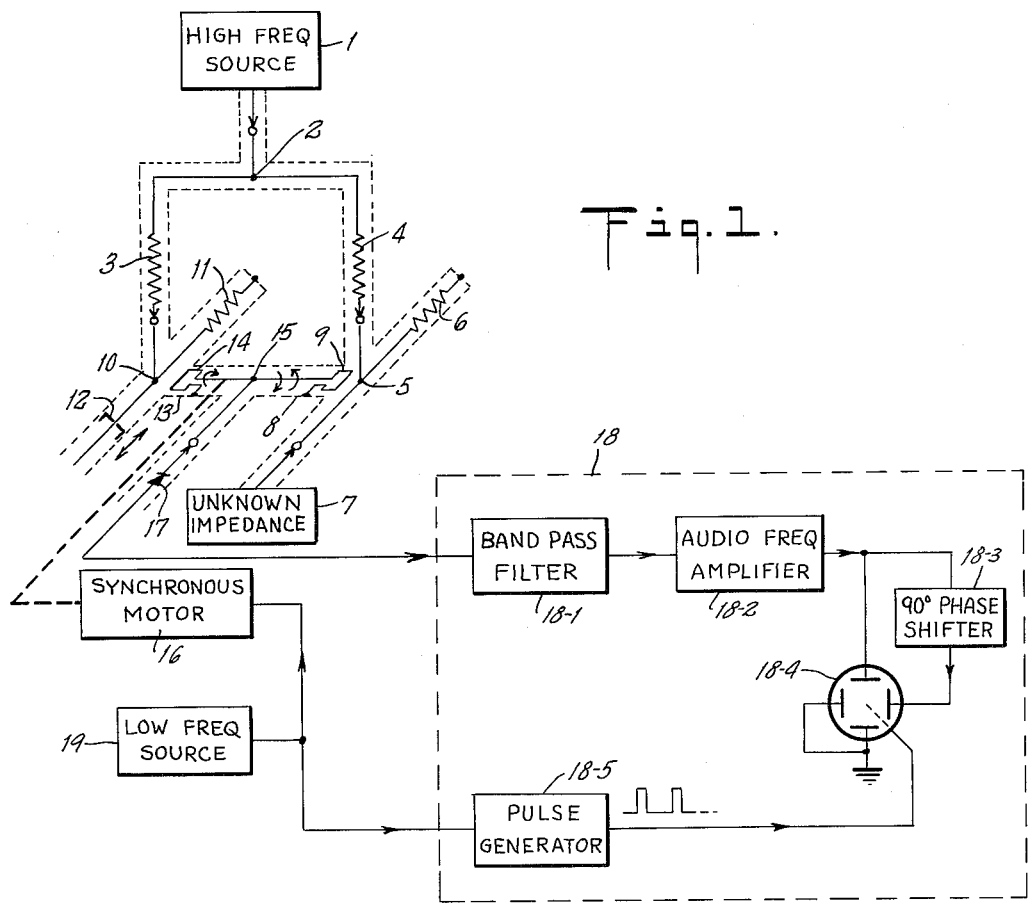
FIG. 1 shows a schematic drawing to explain the principle of the invention.

In FIG. 1, the reference 1 is the electric source for high frequency waves, 2 is a T-divider, 3 and 4 are resistance pads for matching (around 30 to 200 Ω), 5 is also a T-divider, 6 is standard terminal resistance ($Z_o$) 7 is an article to be measured ($Z_x$), 8 is an electric shielding, 9 is a coupling loop composed together with 8 as one body. It can be turned 90 degrees by hand for the purpose of an independent magnetic coupling with either horizontal or vertical arm of the T divider 5. The parts from 2 to 7 are composed of the coaxial circuits of a special indepedence $Z_o$.

In the following the circuits from 4 to 9 are referred to as "reflection component detector." 10 is a T divider, 11 is a standard terminal resistance ($Z_o$), 12 is a standard reactance, for example, it is arranged to afford either $+jZo$ or $-jZo$ at the dividing point of the T divider 10, using coaxial short circuiter with $n/8$ λ at which $n$ is an odd number and λ represents wave length. 13 is an electric shielding, 14 is a coupling loop, 13 and 14 being composed in one single body. The coupling loop is turned at the speed of $p$ times per second by means of a synchronous motor 16.

2, 3, 10, 11, 12 are composed of coaxial circuits of a special impedance $Z_o$. The circuits from 10 to 14 are referred to as "coaxial frequency shifter." 15 is a mixing T divider and is composed coaxially. 17 is a square detector. 18 is an oscilloscope for direct reading of impedance, and 18–1 is a narrow band pass filter of which the center frequency is $p$, 18–2 is an audio amplifier, 18–3 is a 90 phase shifter for $p$ c.p.s. ($p$ cycle per second), 18–4 is Braun tube. 18–5 is a pulse generator for generating positive pulse (cycle: $p$ per second) with very narrow band width, synchronizing with the revolution of the coupling loop 14. Its output is given to the control grid of the Braun tube to make brightness modulation.

19 is the low frequency electric source for driving the synchronous motor 16 and the pulse generator 18–5. As said source, commercial source with 50 cycles is employed usually. A variable capacitor may be employed in the case of low frequency as reactance.

Now, referring to FIG. 1, when the high frequency source 1 is connected to the T divider 15, and the detector 17 to the T divider 2, it offers a very favorable condition for checking the impedance, the impressed voltage to the test object 7 becoming very small now.

Figure 2:
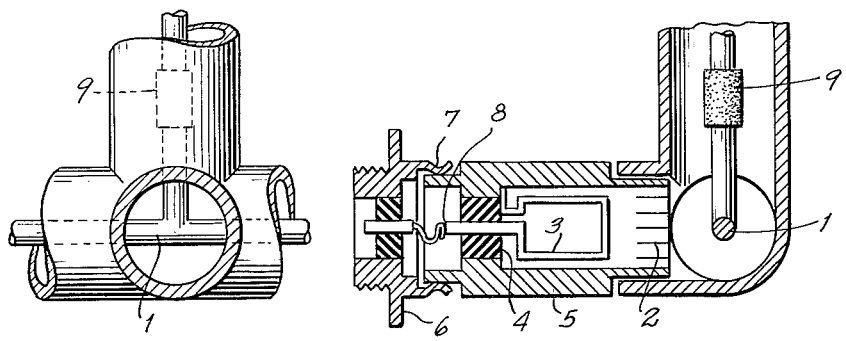
FIG. 2 shows enlarged partial constructions of the rotary coupling loop of a reflection component detector and a coaxial frequency shifter.

FIG. 2 shows a concrete layout of the revolving coupling loop part of the "reflection component detector" and the "coaxial frequency shifter." Here 1 is a coaxial T divider, 2 is an electric shielding, 3 is a coupling loop, which is fixed to the round tube 5 by means of a supporter 4. 6 is a fixed connector, which is coupled to the revolving parts 3, 5 through the contacts 7 and 8.

At the "reflection component detector" it is so arranged that the round tube 5 could be turned manually to 90 degrees that the coupling loop 3 could be coupled independently and exactly to the horizontal arm or vertical arm of the T divider.

At the "coaxial frequency shifter" it is so arranged that the round tube 5 could be turned round $p$ times per second through a gear coupling by means of a synchronous motor, 9 being a resistance pad for matching. The adequate number of windings of the coupling loop is 4 turns for the range of 25 mc. to 1,000 mc., and 1 turn for the range of 500 mc. to 2,500 mc. For under 25 mc., it is recommended to add one further turn.

In the following the principle of the operation of the invention will be explained:

First of all, the parts of the reflection component detector of FIG. 1 are take up.

When the surface including that of the loop of the coupling loop 9 gets parallel to the horizontal or vertical arm of the T divider, it means that the coupling loop has coupled respectively to the horizontal or vertical arm independently. The voltage of the loop at said two cases is represented by the following formulae:

In case of coupling to the horizontal arm only $$\dot{V}_\mathrm{H} = k_1 \frac{\dot{Z}_x - Z_o}{\dot{Z}_x + Z_o} I_1 \exp(j2\pi ft) = k_1 \cdot \dot{R}_x \cdot I_1 \exp(j2\pi ft) \tag{1}$$

In case of coupling to the vertical arm only $$V_v = k_1 \cdot I_1 \exp(j2\pi ft) \tag{2}$$

where:

$$\dot{R}_x = |R_x| \exp(j\eta)$$

the complex reflection coefficient of the test object at T divider 5

$I_1$: the current imposed on T divider 5
$f$: frequency of the high frequency current
$K_1$: degree of coupling between the coupling loop 9 and the T divider 5.

It is evident that $\dot{V}_\mathrm{H}$ is proportional to $\dot{R}_x$ so long as $V_v$ is constant in accordance with the Formulae 1 and 2.

Now, it will be discussed on the parts of the "coaxial frequency shifter" in FIG. 1. A circularly polarized magnetic field is produced at the part of the T divider 10, because 11 is $Z_o$ and 12 is $+jZo$ (or $-jZo$).

Therefore, when the coupling loop 14 is coupled to it through an electric shielding 13 and the loop is turned around at the speed of $p$ times per second, output voltage of the loop shifted in frequency P c.p.s. can be obtained.

That is to say, when the loop output voltage is $\dot{V}_{F.S.}$.

$$V_{F.S.} = k_2 \cdot \dot{I}_2 \exp\{j2\pi(f+p)t\} \quad (-) \qquad (3)$$

Here $\dot{I}_2$: current to the T divider 10

$k_2$: degree of coupling between the coupling loop 14 and the T divider 10.

$\dot{V}_{F.S.}$ and $\dot{V}_H$ or $\dot{V}_V$ are mixed at the T divider 15, and added as an energy upon the square detector 17.

When the output voltage of said detector is picked up through a narrow band pass filter 18–1 with a center frequency $p$, the output voltage of the filter will be as follows respectively:

From the Formulae 1 and 3, when the loop 9 of the reflection component detector is set horizontal:

$$E_H = 2K_1 K_2 K_3 |R_x| \cdot |I_1| \cdot |I_2| \cdot \cos(2\pi pt - \xi - \eta) \quad (+)(+) \qquad (4)$$

When the loop 9 of the reflection component detector is set vertical: From the Formulae 2 and 3

$$E_V = 2k_1 k_2 k_3 |I_1| \cdot |I_2| \cdot \cos(2\pi pt - \xi) \quad (+) \qquad (5)$$

Here $k_3$ represents the coefficient including the sensitivity and the insertion loss of the band filter, and $\xi$ represents the phase difference between $\dot{I}_1$ and $\dot{I}_2$.

When the voltage after the Formulae 4 or 5 is given to the vertical and horizontal deflection electrodes of the Braun tube 18–4 through the audio amplifier 18–2 and the 90 degree phase shifter 18–3 of FIG. 1, circular forms with frequency $p$ appear on the fluorescent surface of the Braun tube 18–4, their radius being proportional to $$|R_x| \cdot |I_1| \cdot |I_2| \text{ or } |I_1| \cdot |I_2|$$

respectively. On the other hand, when the brightness modulation is carried out, generating repeatedly very narrow positive pulses with a constant phase at the repetition rate $p$ by means of a pulse generator 18–5 and applying them to the control grid of the Braun tube, some bright spots appear on the fluorescent surface, and consequently $(\xi+\eta)$ and/or $\xi$ can be detected.

Thus, if a scale plate of Smith chart is provided in front of the fluorescent surface, $\dot{R}_x$ and accordingly $\dot{Z}_x$ can be read directly in the following way:

(1) Setting a coaxial short circuiter 12 at $n/8\lambda$ ($n$ is an odd number), Standard reactance setting, (2) Connecting the test object ($\dot{Z}_x$) 7, (3) Adjusting the output of the source for high frequency and phases of the pulses from the pulse generator so, that the position of the bright spots on the Braun tube (that shows the voltage at Formula No. 5) comes to the position of $r=0$, $x=0$ on the Smith chart, setting the coupling loop 9 vertically, Sensitivity and phase calibration, (4) The output of the high frequency source and phases of the Pulses show the bright spots $\dot{R}_x = |R_x| e^{j\eta}$ (Formula No. 4) Measurement.

(5) Turning $\dot{R}_x$ into $\dot{Z}_x = r + jx$ by means of the Smith chart.

Thus the impedance of the test object $Z_x$ can be read directly. But the reference plane of the measurement is situated at the junction of the T divider 5. As a means for adjusting or setting the coaxial short circuiter 12 at $n/8\lambda$ ($n$ is an odd number) practically, there is a simple and easy method as follows: Setting the center frequency of the narrow band pass filter changeable from $p$ to $2p$ or vice versa, and then adjusting the position of the short circuit plate of the short circuiter 12 so, that the ellipse figure of fluorescent surface comes to zero, setting the center frequency at $2p$, then the position acquired is just the position required. Though the position of the coupling loop 9 may be either horizontal or vertical in this case, the operation for adjusting is easier when the coupling loop is put horizontally and $Z_o$ is connected instead of $\dot{Z}_x$.

In the case of $3/8\lambda$, the horizontal deflection electrode has to be connected just in reverse of the case of $1/8\lambda$.

Above description is on the principle of the invention. Summing up the characteristics of the arrangement after the present invention, it is described as follows:

I. It is applicable to wide band area, for example, the ranges from 25 mc. to 1000 mc., 500 mc. to 2500 mc. can be covered with one unit.

II. Also the apparatus for under 25 mc. can be easily built after the invention, III. Commercial signal generator can be employed as source for high frequency, IV. It affords more accuracy. It enables the checking of standard reactance ($jZ_o$) and sensitivity.

V. Its construction being simple, it can be built compact and light, i.e., portable. It is easy to manufacture and therefore cheap for production.

Further when a four terminal network to be tested is inserted in place of the reflection component detectors from 4 to 9 in FIG. 1, it enables to read directly the complex transfer coefficient $\dot{T}_x$ too.

The invention provides a number of remarkable features and brings a considerable favorable result in practice.

Thus described what I claim is:

1. An impedance plotting device comprising a pair of coaxial radio frequency transmission lines adapted to receive radio frequency energy, means associated with one of said coaxial lines for providing a circularly polarized magnetic field therein, frequency shifter means coupled to said one coaxial line, said frequency shifter means including a further coaxial line having a rotatable loop shaped center conductor extending within said one coaxial line and means for rotating said center conductor at a predetermined frequency, the other of said pair of coaxial wave transmission lines being adapted to be connected to an element whose impedance is to be measured, a coupling loop extending into said other coaxial line, means coupled to said further coaxial line and said coupling loop for intermodulating and detecting the outputs of said further coaxial line and said coupling loop, means for generating pulses in synchronism with said center conductor rotating means and means for comparing the output energy of said intermodulating and detecting means with said pulses.

2. An impedance plotting device comprising first and second radio frequency coaxial transmission lines adapted to be connected intermediate the ends thereof to a radio frequency source, means arranged to connect an element whose impedance is to be measured to one end of said first coaxial line and a terminating impedance connected to the opposite end thereof, an adjustable length reflecting element connected to one end of said second coaxial line and a terminating impedance connected to the opposite end thereof, a first rotatable loop extending into said second coaxial line intermediate the ends thereof, means for rotating said rotatable loop at a predetermined frequency, a second rotatable loop extending into said first coaxial line intermediate the ends thereof, a square law detector connected to said first and second loops, filter means connected to the output of said detector and adapted to pass energy of said predetermined frequency, means for generating pulses in synchronism with said first loop rotating means and means for displaying the output of said filter means controlled by said pulses.

3. An impedance plotting device comprising first and second coaxial line T-dividers each having three arms, means for connecting a first arm of each said divider to a radio frequency source, a standard terminal resistance connected to a second arm of each of said dividers, means for connecting an element whose impedance is to be measured to the third arm of said first divider, an adjustable length reflecting element connected to the third arm of said second divider, a third T-divider having three arms, first and second coaxial line coupling means arranged respectively to couple electromagnetic energy from said first and second T-dividers to said third T-divider, said first coupling means including a rotatable loop shaped center conductor extending from one arm of said third T-divider and into said second divider adjacent the junction of said first arm thereof therewith, means for rotating said rotatable loop shaped center conductor at a predetermined frequency, said second coupling means including a rotatable loop extending from another arm of said third divider and into said first divider adjacent the junction of said first arm thereof therewith, a square law detector connected to the remaining arm of said third T-divider, filter means connected to the output of said detector and adapted to pass energy of said predetermined frequency, means for generating pulses in synchronism with said center conductor rotating means and means for displaying the output of said filter means controlled by said pulses.

4. Apparatus as set forth in claim 3 in which said displaying means comprises an oscilloscope having deflecting plates and an intensity control and wherein the output of said filter means is connected to said deflecting plates and said pulse generating means is connected to said intensity control.

References Cited by the Examiner
UNITED STATES PATENTS

| | | | |
|---|---|---|---|
| 2,642,473 | 6/1953 | Kreer | 324—88 X |
| 2,723,377 | 11/1955 | Cohn | 324—58 X |
| 2,931,900 | 4/1960 | Goodman | 324—58 X |
| 3,035,225 | 5/1962 | Tsuchiya | 324—58 |
| 3,061,780 | 10/1962 | Watts | 324—58 X |
| 3,093,825 | 6/1963 | Allen | 324—58 X |

OTHER REFERENCES

"An Automatic Impedance Recorder For X-Band," NRL Report 4204, Aug. 20 1953, U.S. Naval Research Laboratory, Wash., D.C., pp. 1–32.

WALTER L. CARLSON, *Primary Examiner.*